March 21, 1961 R. A. LATTIN 2,975,843
GARDEN TOOL
Filed Aug. 29, 1958
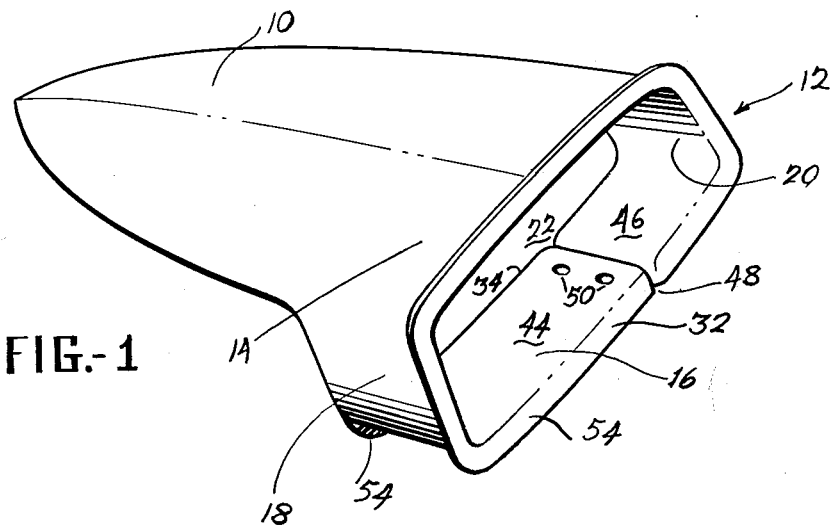
FIG.-1
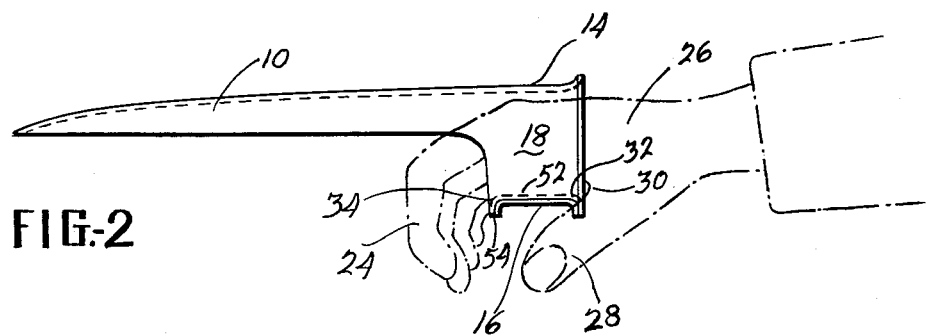
FIG.-2
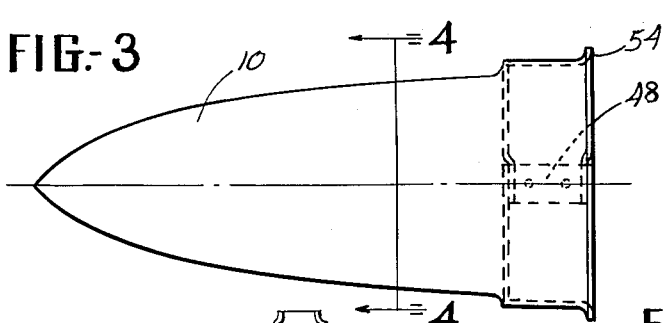
FIG.-3
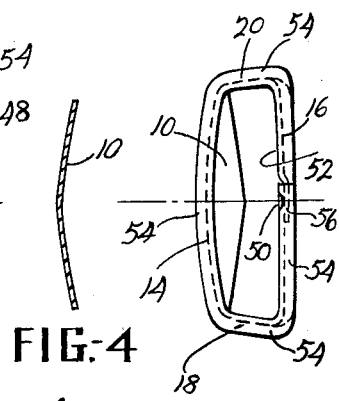
FIG.-5
FIG.-6
FIG.-7
INVENTOR
ROBERT A. LATTIN
Sidney A. Ochs
ATTORNEY

2,975,843

GARDEN TOOL

Robert A. Lattin, 19401 Greydale, Detroit 19, Mich.

Filed Aug. 29, 1958, Ser. No. 758,035

6 Claims. (Cl. 172—370)

This invention relates to improvements in hand garden tools and more particularly to a form of garden tool having a handle portion adapted to provide the user with exceptional digging and tilling action and which permits the fingers freedom of action for picking up objects, thinning out plants, or using another implement, all without displacing the hand from the tool, yet which permits the tool to be easily slipped from the hand when the user desires to put it aside or to transfer the same from one hand to the other.

Hand gardening tools heretofore have either been of the type providing a handle extending rearwardly from the tool which must be firmly grasped by the entire hand of the user and does not permit use of the fingers while still holding the tool, or have been of a type where the handle was strapped to the back hand or arm of the user by one or more flexible lasts or straps. These were uncomfortable, readily breakable and had to be replaced after extended use. Moreover, they permitted rubbing and chafing of the skin, provided no protection for the knuckles when digging the earth and did not give the user the added purchase possible by use of the palm of the hand for applying pressure to the tool to cause the same to penetrate or disturb the earth.

My invention avoids these disadvantages and provides a garden tool having a permanent hand grip which may be grasped between the thumb and palm of the hand and which facilitates manipulation of the tool with greater force for disturbing the garden earth, yet which is of a character permitting free functioning of the forefingers and thumb for other operations without setting the tool aside and without producing physical discomfort.

Another object is to provide a garden tool having a permanent mitten-like handle, providing protection for the back of the hand and which is readily grasped or put aside.

A particular object is to provide a garden tool or implement having a handle which may be grasped between the thumb and palm of the hand and allow the fingers to have freedom of movement for picking up and separating weeds or other debris from the soil without laying the tool aside.

A specific object is to provide a garden tool comprising a handle and blade, the latter of which forms a guard for and protects the user's hand against sharp objects and the like during use or should the tool slip accidentally when applying force on the handle.

Another specific object is to provide a garden tool having a sleeve-like handle that is readily held by a human hand and that takes advantage of the natural gripping power of certain portions of the hand.

A further object is to provide a garden tool or implement comprising a handle and earth disturbing blade which may be used with equal ease with the right or left hand.

A still further object is to provide a garden tool having a separable blade and handle for facilitating the use of a handle of a size best suited to the user.

It is also an object to provide a garden tool comprising a handle of rigid sleeve-like character and an integral blade shaped to perform useful earth disturbing functions.

Still another object is to provide a garden tool comprising a sleeve-like handle and an integral blade forming a forward continuation of the knuckle side of the handle, which handle may be grasped to form a closed fist around the same with the knuckle side of the handle and the blade providing protection for the hand and which tool so grasped may be used to support the weight of the user in moving from place to place and without need of the user bringing his hand in direct contact with the ground.

A further object is to provide a garden tool with a sleeve-like handle which when grasped between the palm and thumb of the hand can be given a twisting action in use effective for digging or tilling the soil.

Another particular object is to provide a garden tool useful in planting sets or seeds which tool has a handle which may be grasped by the hand in a manner facilitating use of the blade of the tool for disturbing the soil while leaving the fingers free for such planting and without putting the tool aside.

Other objects and advantages of my invention will be apparent from the following description of one embodiment of my invention and from the drawings wherein:

Figure 1 is an elevational view in perspective showing the novel handle of my invention as applied to a garden trowel;

Figure 2 is a side elevational view of the garden tool of Figure 1 showing in phantom the manner of grasping the handle thereof;

Figure 3 is a top plan view of the garden tool of Figure 1 and showing one mode of joining the side wings of the blade to form the handle;

Figure 4 is a cross sectional view taken at 4—4 of Figure 3 showing the shape of the blade of the garden tool;

Figure 5 is an end elevational view of the handle and blade taken looking at the right hand end of Figure 3 and illustrating the manner of joining the blade side wings forming the handle;

Figure 6 is a developed view of the garden tool of my invention of Figure 1 prior to forming; and Figure 7 is an elevational view partly in section of the garden tool of Figure 2 showing one manner of providing a separable handle and blade.

Referring now to the various figures wherein similar numerals represent corresponding parts of the structure of my invention which for purposes of illustration only have been embodied in a garden trowel, the numeral 10 represents an earth disturbing blade, for example a trowel to which is connected a rigid sleeve-like handle generally designated by the numeral 12. The handle is preferably of generally rectangular shape or section and comprises a top side 14, an opposite bottom side 16, and opposite ends 18 and 20. As seen in Figures 1 and 2, the blade 10 preferably forms an integral continuation of the top side 14 of the handle 12.

The sides 14, 16, 18, and 20 define an elongated opening 22 which preferably though not necessarily, will have a length substantially the aggregate width of the fingers 24 of an adult hand 26 except the thumb 28 and a width substantially the thickness of the hand adjacent the knuckles of the hand, that is to say, between the palm and knuckles whereby the fingers may be readily projected through the opening 20 or withdrawn therethrough and the bottom side 16 of the handle comfortably grasped between the thumb and palm of the hand with the top side 14 in juxtaposition to the knuckles but not in contact therewith. As seen in Figure 2, the crook or web portion 30 of the hand between the thumb and index finger serves as a stop for the hand against the rearward edge 32 of the side 16.

It will be evident from Figure 2 that the bottom side 16 of the handle has a width permitting the fingers 24 to crook past the forward edge 34 of the bottom side 16 so as to be free for manipulation independently of the handle.

The blade 10 and handle 12 may be formed in any desired manner, for example, from a section of tubing, but I preferably make the same from a flat sheet of metal of generally T shape shown for example in Figure 6, the stem portion 36 of which provides the blade 10, and the cross bar portion 38 of which forms the handle 12, the wings 40, 42 of the portion 38 being underturned and shaped as seen in Figures 1, 2, 3, and 5, to form the end sides 18 and 20 of the handle and the sections 44, 46 respectively of the bottom side 16.

As best seen in Figures 3 and 5, the sections or wings 44, 46 of the bottom side 16 overlap each other to form a lap joint generally designated by the numeral 48, the parts of which may be secured together by spot welding as at 50, preferably without disturbing the smooth finish of the inner face 52 of the side 16. Flat head rivets may be used if desired.

In order to provide the greatest comfort for the user and to enable the greatest pressure application to the blade, without cutting into the hand, the periphery of the handle portion 12 at the forward and rearward ends are formed with outwardly flaring flange, cuff or rolled portions 54, that at the forward end being preferably limited as shown, to the bottom side 16 and portions of the ends 18, 20.

The portions of the sections 44, 46 of the bottom side 16 which overlap to form joint 48 are so shaped as to telescope with each other and provide a smooth inner face on the handle. Thus as seen in Figure 5, the underlapping portion 56 of the section 46 is offset the thickness of the metal to make this possible. Moreover, this portion is narrowed slightly, as seen in Figure 3, to fit within and nest with its opposite mating section 44.

The blade 10 when it is to be used as a trowel, is preferably formed as seen in Figure 4 with a concave-convex section which adds to the inherent rigidity of this portion and the handle 12.

The construction thus described forms a rigid garden tool readily manipulated by either hand for earth disturbing functions. It will be evident that the handle structure and shaping is such that the tool may be guided forwardly and/or turned and twisted without causing any skin abrasion since the handle once grasped is not subject to relative movement with respect to the back of the hand. It will also be evident that with the described handle structure great pressure may be transmitted to the blade of the tool by the palm of the hand. Moreover, the fingers are kept free to be manipulated to pick up objects in the soil or to place objects therein without removing the tool from the hand. Furthermore, the top side 14 of the handle 12 and the blade portion 10 provide an armored protective wall for the back side of the hand against rubbing or abrasion with needle-like leaves and the like of shrubs and provide an earth rest for the hand against which the entire weight of the body of the user may be directed upon doubling the hand into a fist grip around the bottom side of the handle. When used in this manner the body may be shifted from one position to another without making direct contact with the soil.

In some cases it may be desired to provide handles of different size as for adults and children but which can employ the same blade. Moreover, it may be desired to furnish a handle that can be attached to a number of different blades. For such applications the blade 10 and handle 12 may be made as separable members 10A and 12A respectively. As seen in Figure 7, the top side 14 of the handle in such cases has a forward extension 60 which may be lapped with the rearward portion 62 of the blade and secured together in any suitable manner as by a plurality of bolts and wing nuts 66. By preference, the extension 60 will underlap the blade portion 62 to avoid any sharp edges abrading the skin of the hand and for similar reasons the bolts 66 are preferably of the flat head type and flush with the inner side of the extension.

From the above description of my invention, it will be seen that I have provided a novel garden tool construction featuring a mitten-type handle or grip portion providing excellent means of manipulating the blade portion and permitting free use of the fingers of the hand without removing the tool.

It will be understood that various changes and modifications may be made in the details, materials and arrangement of parts of the structure of my invention by those skilled in the art without departing from the spirit and intent of my invention and all such changes and modifications and equivalent constructions are contemplated as may come within the scope of my invention as expressed in the appended claims.

I claim:

1. A garden tool comprising a substantially rigid sleeve-like handle of generally rectangular section, said handle comprising a top side, a bottom side and opposite ends defining an elongated opening for receiving all the fingers of the hand of a user but not the thumb such that said bottom side may be grasped between the palm and thumb for manipulating said tool and with the top side opposite the bottom side and in proximity to the knuckles and extending forwardly beyond said bottom side for protecting the same, said bottom side having a width permitting said fingers to crook past the forward edge thereof so as to be free for manipulation independently of said handle, and a soil disturbing blade extending forwardly from said top side of said handle.

2. A garden tool comprising a substantially rigid sleeve-like handle of generally elongated rectangular section, said handle comprising top and bottom sides and opposite ends defining an elongated opening having a length substantially the aggregate width of the fingers of an adult hand except the thumb and a width substantially the thickness of the hand adjacent the knuckles whereby said fingers may be projected through said opening with the web portion of the hand between the thumb and index finger serving as a rearward stop for said handle and with the said bottom side of said handle grasped between the palm and thumb for manipulating said tool, the said top side being opposite said bottom side and extending forwardly beyond said bottom side in proximity to the knuckles for protecting the top side of the hand, said bottom side having a width permitting said fingers to crook past the forward edge thereof so as to be free for manipulation independently of said handle, and a soil disturbing implement extending forwardly of the top side of said handle and rigidly connected therewith.

3. A garden tool as claimed in claim 2 wherein said handle has an outwardly flaring rounded flange portion around the periphery of the rearward edge thereof and an outwardly flaring rounded flange portion at the forward edge of said bottom side.

4. A garden tool as claimed in claim 2 wherein said implement comprises a convex-shaped trowel integral with and generally in the plane of said top side.

5. A garden tool as claimed in claim 2 comprising a single piece of metal of generally T shape, the leg portion of said T being shaped to form said earth disturbing implement and the top portion of said T comprising side wings bent under said leg portion and in spaced relation thereto to form said sleeve-like handle, said wings overlapping each other.

6. A garden tool as claimed in claim 1 wherein said blade is separable from said handle.

References Cited in the file of this patent

UNITED STATES PATENTS

| | | |
|---|---|---|
| 407,571 | Calef | July 23, 1889 |
| 876,200 | Lang | Jan. 7, 1908 |
| 1,322,775 | Fallon | Nov. 25, 1919 |
| 1,490,582 | Bellamy | Apr. 15, 1924 |
| 1,929,433 | Kenny | Oct. 10, 1933 |
| 2,076,811 | Ehlers | Apr. 13, 1937 |
| 2,220,319 | Curtis | Nov. 5, 1940 |
| 2,332,683 | Aden | Oct. 26, 1943 |
| 2,565,709 | Walter | Aug. 28, 1951 |

FOREIGN PATENTS

| | | |
|---|---|---|
| 523,958 | Germany | Aug. 28, 1931 |